(12) United States Patent
Chiao et al.

(10) Patent No.: US 9,697,043 B2
(45) Date of Patent: Jul. 4, 2017

(54) METHODS AND COMPUTER SYSTEMS FOR PERFORMANCE MONITORING OF TASKS

(71) Applicant: MediaTek Inc., Hsin-Chu (TW)

(72) Inventors: Mong-Ling Chiao, Taipei (TW); Pokun Tseng, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/751,887

(22) Filed: Jun. 26, 2015

(65) Prior Publication Data

US 2016/0224375 A1 Aug. 4, 2016

Related U.S. Application Data

(60) Provisional application No. 62/110,678, filed on Feb. 2, 2015.

(51) Int. Cl.
*G06F 9/48* (2006.01)
*G06F 11/34* (2006.01)

(52) U.S. Cl.
CPC .......... *G06F 9/4843* (2013.01); *G06F 11/348* (2013.01); *G06F 11/3476* (2013.01); *G06F 2201/88* (2013.01); *G06F 2209/508* (2013.01)

(58) Field of Classification Search
CPC .................................................. G06F 9/4812
See application file for complete search history.

(56) References Cited

U.S. PATENT DOCUMENTS

| 2010/0223598 A1* | 9/2010 | Levine ................ G06F 11/3476 717/128 |
| 2015/0106649 A1* | 4/2015 | Kannan ..................... G06F 1/08 713/501 |
| 2015/0378782 A1* | 12/2015 | Hks ........................ G06F 9/4837 718/103 |

OTHER PUBLICATIONS

Helal, Sumi, Introduction to Mobile Computing, 2006, [retrieved on May 21, 2016]. Retrieved from the Internet <URL: http://www.cise.ufl.edu/class/cen5531fa06>.*

* cited by examiner

*Primary Examiner* — Charlie Sun
(74) *Attorney, Agent, or Firm* — McClure, Qualey & Rodack, LLP (57) ABSTRACT

Computer system including storage unit and processing unit including performance monitoring unit (PMU) for performance monitoring on tasks is provided. Processing unit is configured to provide a callback function at location at which a task switch is being performed, reset a counter for external access counting of PMU when first task switch which is to switch execution of tasks to first task occurs, read counted value from counter and record read value into a log of storage unit as record of first task when second task switch which is to switch execution of tasks from first task to second task occurs, and reset counter for second task after log is generated. Records of first task in log within a predetermined time period are summed to analyze performance of first task within predetermined time period so as to determine performance of external access of first task for specific event.

11 Claims, 5 Drawing Sheets

| T1N1F00 | T1N1F10 | T1N1F01 |

FIG. 7

METHODS AND COMPUTER SYSTEMS FOR PERFORMANCE MONITORING OF TASKS

CROSS REFERENCE TO RELATED APPLICATIONS

This Application claims priority of U.S. Provisional Application No. 62/110,678, filed on Feb. 2, 2015, the entirety of which is incorporated by reference herein.

FIELD OF THE INVENTION

The invention relates to performance monitoring measurements techniques, and more precisely, to methods and computer systems for performance monitoring of multiple tasks on external access.

DESCRIPTION OF THE RELATED ART

In recent years, performance monitoring units (PMU) have been widely used in all high-end processors. A PMU is basically hardware built inside a processor to measure its performance parameters. To obtain performance information, events within the computer system are counted by one or more counters within the PMU. The operation of such counters is managed by control registers. In general, both control registers and the counters are readable and writable using software. Thus, by writing values to the control register, a user may select the events within the computer system to be monitored and specify the conditions under which the counters are enabled.

With the PMU, parameters such as instruction cycles, cache hits, cache misses, branch misses and many others can be measured depending on the support i.e. hardware provided by the processor. In this type of measurement, the total number of events that happen in a given time period can be accumulated and reported at the end of the given time period. The performance control registers are set for counting the desired event and after the end of monitoring period the values of these registers are read.

Currently, the values read can only assist in determining or providing the total number of events that happen or the occurrences of selected events in a given time period, no information regarding occurrences of selected tasks in a given time period can be precisely determined.

BRIEF SUMMARY OF THE INVENTION

In a first aspect of the invention, a computer system is provided. The computer system comprises a storage unit and a processing unit. The processing unit comprises a performance monitoring unit (PMU) for performance monitoring on tasks. The processing unit is configured to provide a callback function at a location at which a task switch is being performed, reset a counter for external access counting of the PMU when a first task switch which is to switch an execution of tasks to a first task occurs, read a counted value from the counter and record the read value into a log of the storage unit as a record of the first task when a second task switch which is to switch the execution of the tasks from the first task to a second task occurs, and reset the counter for the second task after the log is generated. The records of the first task in the log within a predetermined time period are summed to analyze the performance of the first task within the predetermined time period so as to determine the performance of external access of the first task for a specific event.

In a second aspect of the invention, a non-transitory computer readable storage medium is provided. The non-transitory computer readable storage medium has instructions stored therein, which when executed by a computer system, cause the computer system to: provide, at a processing unit, a callback function at a location at which a task switch is being performed; reset, at the processing unit, a counter for external access counting of a performance monitoring unit (PMU) for performance monitoring on tasks when a first task switch which is to switch an execution of tasks to a first task occurs; read, at the processing unit, a counted value from the counter for external access counting of the PMU and record the read value into a log of a storage unit as a record of the first task when a second task switch which is to switch the execution of the tasks from the first task to a second task occurs; and reset, at the processing unit, the counter for external access counting of the PMU for the second task after the log is generated; wherein the records of the first task in the log within a predetermined time period are summed to analyze the performance of the first task within the predetermined time period so as to determine the performance of external access of the first task for a specific event.

In a third aspect of the invention, a method for performance monitoring of tasks executed by a computer system comprising a processing unit and a storage unit is provided, wherein the processing unit further includes a performance monitoring unit (PMU) for performance monitoring on the tasks and the tasks are switchable by the processing unit. The method comprises the steps of: providing, by the processing unit, a callback function at a location at which a task switch is being performed; resetting, by the processing unit, a counter for external access counting of the PMU when a first task switch which is to switch execution of tasks to a first task occurs; reading, by the processing unit, a counted value from the counter for external access counting of the PMU and recording the read value into a log of a storage unit as a record of the first task when a second task switch which is to switch the execution of the tasks from the first task to a second task occurs; and resetting, by the processing unit, the counter for external access counting of the PMU for the second task after the log is generated; wherein the records of the first task in the log within a predetermined time period are summed to analyze the performance of the first task within the predetermined time period so as to determine the performance of external access of the first task for a specific event.

Other aspects and features of the present invention will become apparent to those with ordinary skill in the art upon review of the following descriptions of specific embodiments of and the computer systems and non-transitory computer readable storage mediums for carrying out the method for performance monitoring of tasks.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
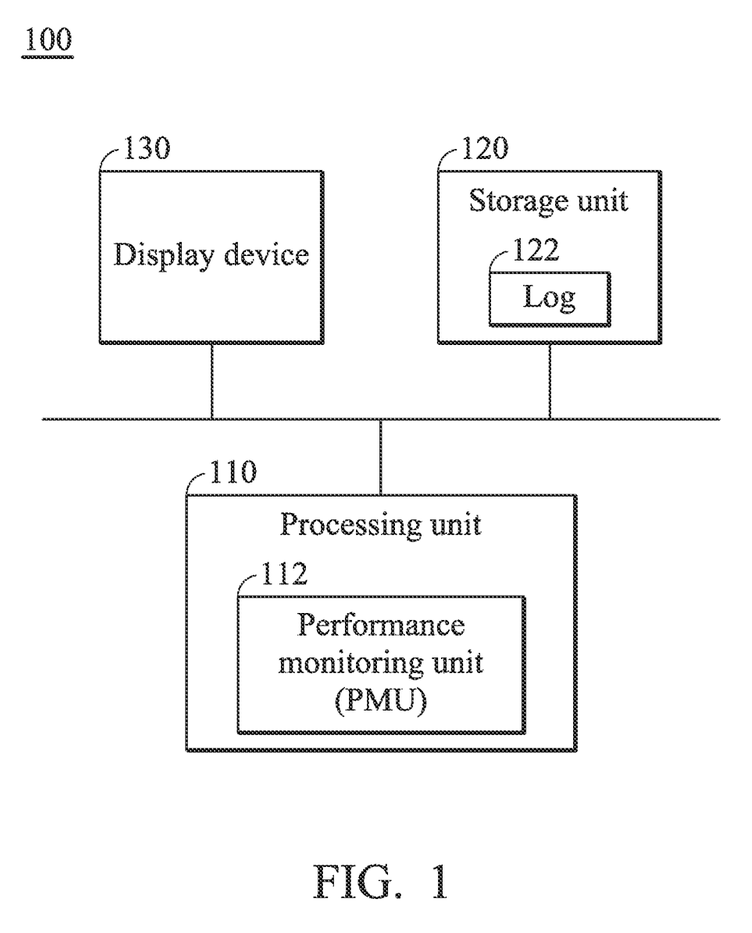
FIG. 1 is a block diagram illustrating the functional units of a computer system according to an embodiment of the invention.

FIG. 1 is a block diagram illustrating the functional units of a computer system 100 according to an embodiment of the invention. In some embodiments, the computer system 100 may be a desktop computer or a mobile device such as a mobile phone, a smartphone, a Portable Media Player (PMP), a handheld gaming console, a tablet computer, or a notebook. The computer system 100 at least comprises a processing unit 110, a storage unit 120 and a display device 130. The processing unit 110 may include a processor and other signal processing circuits. The processor may be a Central Processing Unit (CPU), Micro-Control Unit (MCU), Digital Signal Processor (DSP), or the like, which provides the function of data processing and computing. The processing unit 110 may further include a performance monitoring unit (PMU) 112 for performing performance monitoring on a plurality of tasks. More particularly, the processing unit 110 may load and execute a series of instructions and/or program codes from the storage unit 120 to control the operation of the processing unit 110, the storage unit 120 and the display device 130 for performing the method of the invention, including providing a callback function at a location at which a task switch is being performed, resetting a counter for external access counting of the PMU when a first task switch which is to switch the execution of tasks to a first task occurs, reading a counted value from the counter for external access counting of the PMU for performance monitoring on tasks and recording the read value into a log of a storage unit as a record of the first task when a second task switch which is to switch the execution of the tasks from the first task to a second task occurs and resetting the counter for external access counting of the PMU for the second task after the log is generated. The first function of the callback function is to read a counted value from the counter for external access counting (e.g., from the bus read/write register of the PMU) and records it into a log 122 as a record of the number of events that have occurred for a first task which execution is being switched from (i.e. the execution of the tasks is to be switched from the first task to another second task) when a task switching or a context switching between tasks occurs. The second function of the callback function is to reset the counter (i.e. clear the value of the bus read/write register of the PMU to be zero) for the next task which is being switched to during the task switching (i.e. task switched from the first task to the next task).

The storage unit 120 may be a non-volatile storage medium (e.g., Read-Only Memory (ROM), Flash memory, magnetic tape, hard disk, or optical disc), or a volatile storage medium (e.g., Random Access Memory (RAM)), or any combination thereof for storing data, such as instructions, program codes, user signatures from users. The storage unit 120 may store program codes of an operating system (not shown), such as LINUX, UNIX, OS X, Android, iOS or WINDOWS operating system, or an embedded operating system such as VxWorks therein. The operating system may execute procedures for handling basic system services and for performing hardware dependent tasks. The display device 130 may be a Liquid-Crystal Display (LCD), a Light-Emitting Diode (LED), or an Electronic Paper Display (EPD), for providing the display function. In some embodiments, the display device may further be integrated with a touch-sensitive device (not shown). The touch-sensitive device comprises a touch-sensitive surface comprising sensors in at least one dimension to detect contact and/or movement of at least one object (input tool), such as a pen/stylus or finger near or on the touch-sensitive surface.

Although not shown, the computer system 100 may further comprise other functional units, such as a wireless communication unit, an Input/Output (I/O) device, e.g., button, keyboard, or mouse, etc., and the invention is not limited thereto. The wireless communication unit is responsible for providing the function of wired or wireless network access, so that the computer system 100 may connect to the Internet or a particular server set up on the Internet. The wired network access may include an Ethernet connection, an Asymmetric Digital Subscriber Line (ADSL), a cable connection, or the like. The wireless network access may include a connection to a Wireless Local Area Network (WLAN), a WCDMA system, a Code Division Multiple Access 2000 (CDMA-2000) net system work, a Time Division-Synchronous Code Division Multiple Access (TD-SCDMA) system, a Worldwide Interoperability for Microwave Access (WiMAX) system, a Long Term Evolution (LTE) system, an LTE Advanced (LTE-A) system, or a Time-Division LTE (TD-LTE) system. The wireless communication unit may comprise a Radio Frequency (RF) unit and a Baseband unit. Specifically, the Baseband unit may contain multiple hardware devices to perform baseband signal processing, including ADC/DAC, gain adjusting, modulation/demodulation, encoding/decoding, and so on, while the RF unit may receive RF wireless signals, convert the received RF wireless signals to baseband signals, which are processed by the Baseband unit, or receive baseband signals from the baseband unit and convert the received baseband signals to RF wireless signals, which are transmitted later. The RF unit may also contain multiple hardware devices to perform radio frequency conversion, such as a mixer for multiplying the baseband signals with a carrier oscillated in the radio frequency of the wireless communications system, wherein the radio frequency may be 2.4 GHz or 5 GHz utilized in the Wireless-Fidelity (WiFi) technology, or may be 2.402-2.480 GHz utilized in the Bluetooth technology, or others depending on the wireless technology in use.

Figure 2:
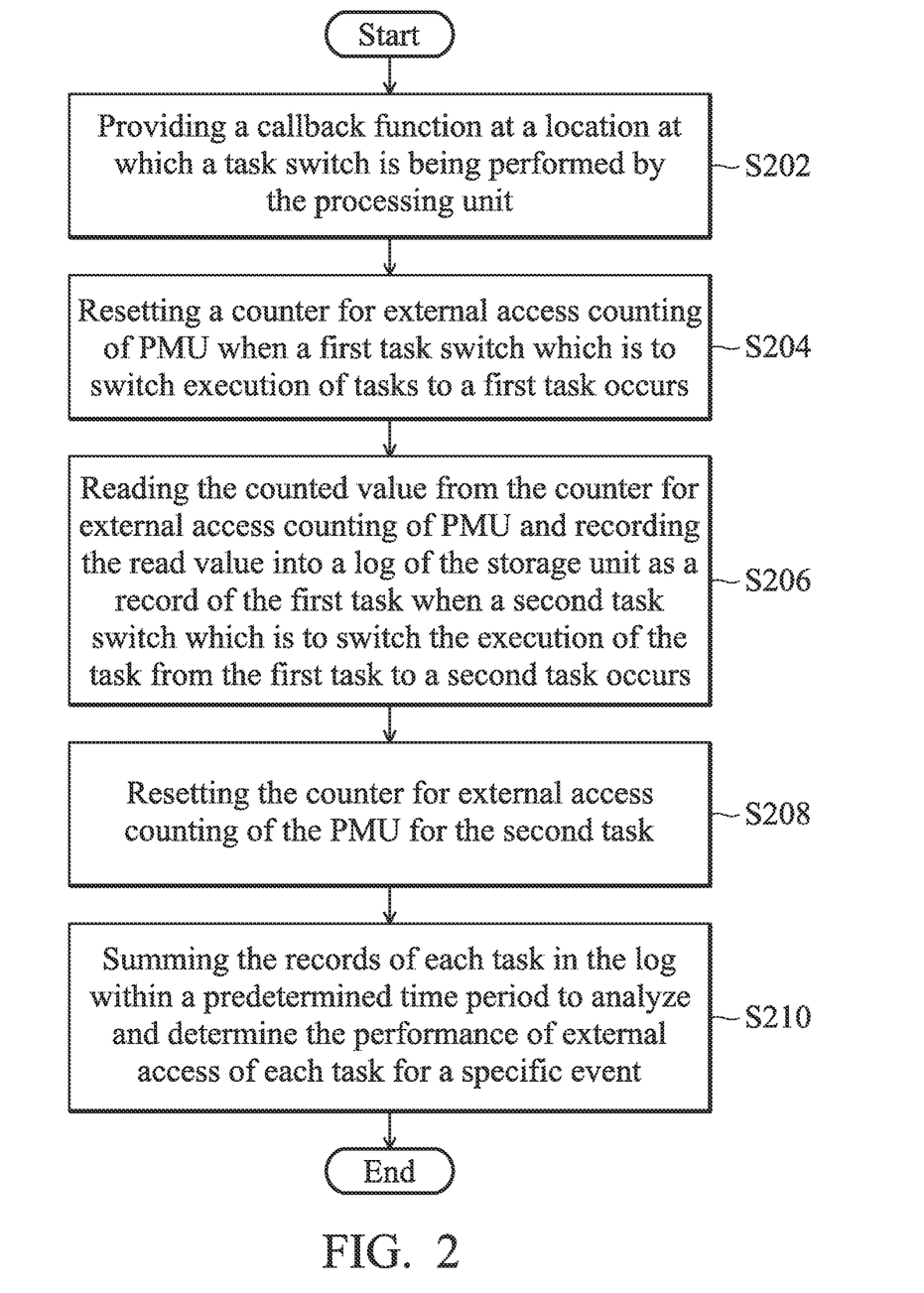
FIG. 2 shows a flow chart of the method for performance monitoring of tasks according to an embodiment of the invention.

FIG. 2 shows a flow chart of the method for performance monitoring of tasks according to an embodiment of the invention. In this embodiment, the method can be applied to the computer system 100 as shown in FIG. 1 and performed by the processing unit 110 of the computer system 100.

First, in step S202, a callback function is provided at a location at which a task switch is being performed by the processing unit. The location at which the task switch is being performed means a location in the application where the processing unit 110 will perform a context switch between tasks to switch the execution from one task to another when a task switch occurs. Therefore, the callback function can be performed by the processing unit 110 every time a task switch occurs. Specifically, the callback function can be performed when a first task switch which switches the execution of the tasks from a first task T1 to a second task T2 occurs or it can be performed when a second task switch which switches the execution of tasks from the second task T2 back to the first task T1 occurs.

Then, when a first task switch which is to switch the execution of tasks to a first task T1 of the tasks occurs, in step S204, a counter for external access counting of the PMU is reset by the processing unit 110 based on the callback function. To be more specific, resetting the counter for external access counting of the PMU 112 means clearing the counted value of the counter and setting it to zero. In one embodiment, the counter for external access counting of the PMU 112 is a bus read/writer register of the PMU 112, which counts each time a bus reading/writing is to be performed. From the counted value of the counter for external access counting of the PMU, a bandwidth or performance of external access for a specific task can be measured. To be more specific, as the counter is reset, the value of the counter is set to zero and it starts counting and increases the counted value by one each time a bus reading/writing is to be performed during the execution of the first task T1.

Later, when a second task switch which is to switch the execution of the task from the first task T1 to a second task T2 of the tasks occurs, in step S206, the counted value is read from the counter for external access counting of the PMU 112 and the read value is then recorded into a log 122 of the storage unit 120 as a record of the first task by the processing unit 110 based on the callback function.

After the log 122 is generated, in step S208, the counter for external access counting of the PMU 112 is reset for the second task by the processing unit 110 based on the callback function. Thereafter, if a software engineer or debugger wishes to analyze the task performance for all the tasks within a predetermined time period (e.g., 1 ms, 10 ms or others), in step S210, the log 122 within a predetermined time period can be generated by the above-mentioned steps and the records of each task in the log within the predetermined time period are summed to analyze the performance of each task within the predetermined time period so as to determine the performance of external access of each task for a specific event. For example, all of the records of the first task T1 in the log within the predetermined time period are summed to analyze the performance of the first task within the predetermined time period so as to determine the performance of external access of the first task T1 for a specific event.

Figure 3:
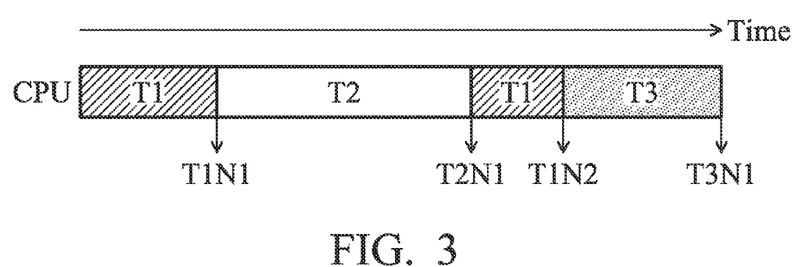
FIG. 3 is a schematic diagram illustrating an execution flow for a predetermined time period about a specific event according to an embodiment of the invention.

FIG. 3 is a schematic diagram illustrating an execution flow for a predetermined time period about a specific event according to an embodiment of the invention. In this embodiment, it is assumed that there are three tasks T1, T2 and T3 being switched in a processing unit with one processing core or CPU. As shown in FIG. 3, the execution flow shows the tasks are being executed in order from T1, T2, T1 to T3, wherein task T1 is being performed twice, task T1 is being performed twice and tasks T2 and T3 are being performed once, and wherein TiNj represents a counted value j of external access for the task i. For example, T1N1 represents the first counted value for the task 1, T2N1 represents the first counted value for the task 2, T1N2 represents the second counted value for the task 1, T3N1 represents the first counted value for the task 3 and so forth.

Figure 4:
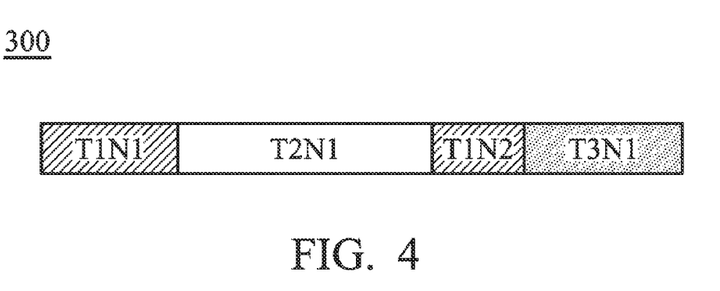
FIG. 4 is a schematic diagram illustrating a log corresponding to the execution flow of FIG. 3 according to an embodiment of the invention.

FIG. 4 is a schematic diagram illustrating a log corresponding to the execution flow of FIG. 3 according to an embodiment of the invention. As shown in FIG. 4, a log 300 is presented in which task T1 is being performed twice, and wherein TiNj represents a counted value j of external access for the task i. For example, T1N1 represents the first counted value for the task 1, T2N1 represents the first counted value for the task 2, T1N2 represents the second counted value for the task 1, T3N1 represents the first counted value for the task 3 and so forth. The total count or total number TN1 of events that have occurred for task T1 can be calculated by summing the counted values relative to task T1 in the log 300. That is, TN1=T1N1+T1N2 since there are two records for task T1 in the log 300. The total count or total number TN2 of events that have occurred for task T2 can be calculated by summing the counted values relative to task T2 in the log 300, that is, TN2=T2N1 since there is only one record for task T2. The total count or total number TN3 of events that have occurred for task T3 can be calculated by summing the counted values relative to task T3 in the log 300, that is, TN3=T3N1 since there is only one record for task T3. Then, the software engineer may select from these tasks for optimization according to the total number of events that have occurred for all the tasks. For example, if the values of T1N1, T2N1, T1N2 and T3N1 are 2, 5, 1, 4, respectively, task T2 will be selected to be rewritten or redesigned for optimization since the total number of the events that have occurred for task T2 has the largest value than others.

In some embodiments, the processing unit 110 may further include two or more processing cores or CPUs and the processing unit may further be configured to reset the counter for external access counting of the PMU 112 when a fourth task switch which is to switch the execution of tasks to the first task at each processing core or CPU occurs, read the counted value from the counter for external access counting of the PMU 112 and record the read value into the log 122 as a record of the first task when a fifth task switch which is to switch the execution of the tasks from the first task to the second task at each processing core or CPU occurs, and reset the counter for external access counting of the PMU for the second task at each processing core or CPU after the log is generated. The records of the first task for all of the processing cores in the log 122 within the predetermined time period can then be summed to analyze the performance of the first task within the predetermined time period so as to determine the performance of external access of the first task for the specific event.

Figure 5:
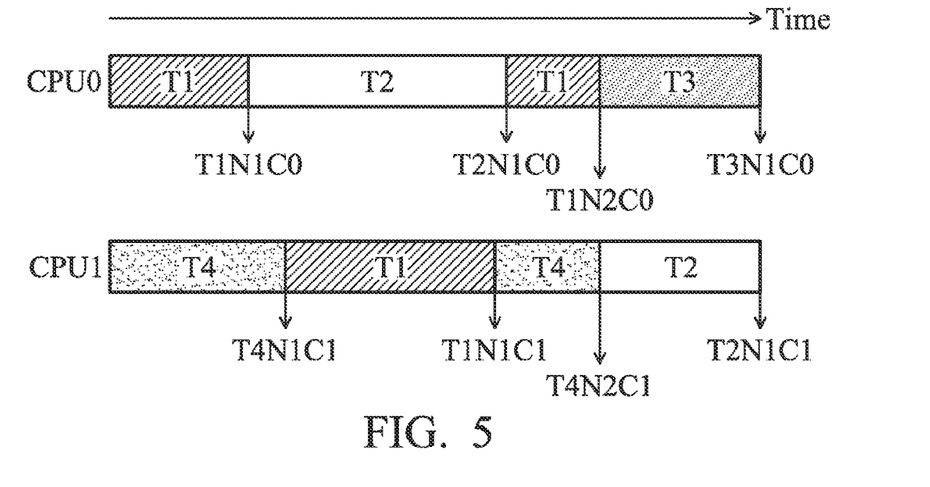
FIG. 5 is a schematic diagram illustrating an execution flow for a predetermined time period about a specific event according to an embodiment of the invention.

FIG. 5 is a schematic diagram illustrating an execution flow for a predetermined time period about a specific event according to another embodiment of the invention. In this embodiment, it is assumed that there are four tasks T1, T2, T3 and T4 being switched in a processing unit with two processing cores or CPUs CPU0 and CPU1. As shown in FIG. 5, the execution flow shows the tasks are being executed at either the CPU0 or CPU1, wherein the tasks are being executed in order from T1, T2, T1 to T3 at CPU0 and from T4, T1, T4 to T2 at CPU1. TiNjCk represents a counted value j of external access for the task i in CPUk.

Figure 6:
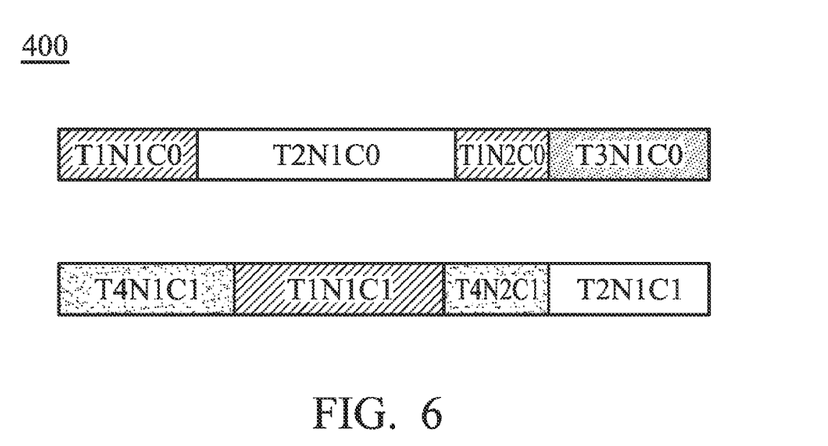
FIG. 6 is a schematic diagram illustrating a log corresponding to the execution follow of FIG. 5 according to another embodiment of the invention.

FIG. 6 is a schematic diagram illustrating a log corresponding to the execution follow of FIG. 5 according to another embodiment of the invention. As shown in FIG. 6, a log 400 is presented in which task T1 is being performed twice at the CPU0 and once at the CPU1, and wherein TiNjCk represents a counted value j of external access for the task i in CPUk. For example, T1N1C0, T2N1C0, T1N2C0 and T3N1C0 represent the first counted value for task T1 at the CPU0, the first counted value for task T2 at the CPU0, the second counted value for task T1 at the CPU0 and the first counted value for task T1 at the CPU0, respectively. Similarly, T4N1C1, T1N1C1, T4N2C1 and T2N1C1 represent the first counted value for task T4 at the CPU1, the first counted value for task T1 at the CPU1, the second counted value for task T4 at the CPU1 and the first counted value for task T2 at the CPU1, respectively. In one embodiment, the total count or total number of events that have occurred for task T1 for all the CPUs can be calculated by summing the counted values relative to task T1 in the log. For example, the total count or total number TN1' of events that have occurred for task T1 for all the CPUs (i.e., both the CPU0 and CPU1) can be calculated by summing the counted values relative to task T1 in the log 400, that is, TN1'=T1N1C0+T1N2C0+T1N1C1, since there are two records for task T1 at the CPU0 and one record for task T1 at the CPU0 in the log 400. In another embodiment, the total count or total number of events that have occurred for task T1 for each of the CPUs can also be calculated by summing the counted values relative to task T1 at each CPU recorded in the log. For example, the total count or total number TN10" of events that have occurred for task T1 at the CPU0 can be calculated by summing the counted values relative to task T1 at CPU0 in the log 400, that is, TN10"=T1N1C0+T1N2C0 while the total count or total number TN11" of events that have occurred for task T1 at the CPU1 can be calculated by summing the counted values relative to task T1 at CPU1 in the log 400, that is, TN11"=T1N1C1, since there are two records for task T1 at the CPU0 and one record for task T1 at the CPU0 in the log 400. Then, the software engineer may select from these tasks for optimization according to the total number of events that have occurred for all the tasks at individual CPU or all the CPUs.

According to another embodiment of the invention, the number of function calls, subroutines or modules that have occurred within a predetermined time period can be determined to provide function-based analysis for each task. For example, in one embodiment, the first task may also include a plurality of function calls and the processing unit 110 can be configured to provide a tag for each of the function calls, generate the tag for a first function call for counting the occurrence of the first function call every time the function call is being performed prior to the occurrence of the second task switch, and read the counted value for occurrences of the first function call and record the read value into the log of the storage unit as a record of the first function call when the second task switch occurs.

Figure 7:
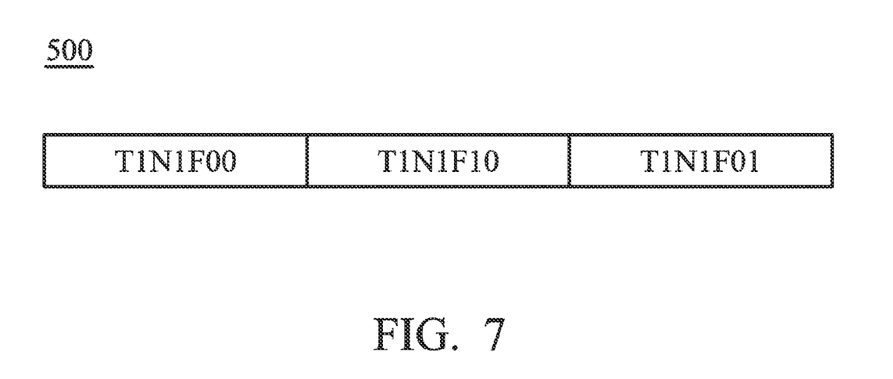
FIG. 7 is a schematic diagram illustrating a log for a predetermined time period according to yet another embodiment of the invention.

FIG. 7 is a schematic diagram illustrating a log for a predetermined time period according to yet another embodiment of the invention. In this embodiment, it is assumed that tasks T1 and T2 are being switched in a processing unit with one processing core or CPU and task T1 includes two function calls FC0 and FC1. As shown in FIG. 7, a log 500 is presented in which task T1 is being performed once and wherein TiNjFml represents a counted value j of external access for the function call FCm of task T1 at lth time. For example, T1N1F00 and T1N1F10 represents the first counted values for the function calls FC0 and FC1 being called or executed at first time in task T1, respectively and T1N1F01 represents the second counted value for the function call FC0 being called or executed at second time in task T1. Similarly, the total count or total number of events that have occurred for each function calls within task T1 can be calculated by summing the counted values relative to the function calls of task T1 in the log, such that the software engineer may further select one of the function calls from them for further optimization of task T1 according to the total number of events that have occurred for all function calls in task T1.

Therefore, according to the non-transitory computer readable storage mediums, computer system and related method for performance monitoring of tasks of the invention, the number of events of external access occurs for each task within any predetermined time period can be precisely determined, thus providing useful information for task performance optimization. In addition, the method of the invention can be applied to a processing unit with one or more processing cores for counting the number of times an external access occurs for each task in each or all of the processing cores within any predetermined time period to discover which task is the overhead bottleneck so as to adjust and enhance the overall system performance for task execution and debugging.

The embodiments of methods for performance monitoring of tasks that have been described, or certain aspects or portions thereof, may be practiced in logic circuits, or may take the form of program code (i.e., instructions) embodied in tangible media, such as floppy diskettes, CD-ROMS, hard drives, or any other machine-readable storage medium, wherein, when the program codes are loaded into and executed by a machine, such as a smartphone, a mobile phone, or a similar device, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, the machine becomes an apparatus for practicing the invention. When implemented on a general-purpose processor, the program codes combine with the processor to provide a unique apparatus that operate analogously to specific logic circuits.

Use of ordinal terms such as "first" and "second" in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. On the contrary, it is intended to cover various modifications and similar arrangements (as would be apparent to the skilled in the art). Therefore, the scope of the appended claims should be accorded the broadest interpretation so as to encompass all such modifications and similar arrangements.

What is claimed is:
1. A computer system, comprising:
a storage unit; and
a processing unit comprising a processor, the processing unit further including a performance monitoring unit

(PMU) for performance monitoring on a plurality of tasks, wherein the plurality of tasks are switchable by the processing unit;

wherein the processor is configured to provide a callback function at a location at which a task switch is being performed, reset a counter for external access counting of the PMU when a first task switch which is to switch an execution of the plurality of tasks to a first task of the tasks occurs, reading a counted value from the counter for external access counting of the PMU and recording the read value into a log of the storage device as a record of the first task when a second task switch which is to switch the execution of the plurality of tasks from the first task to a second task of the tasks occurs, and reset the counter for external access counting of the PMU for the second task after the log is generated,     wherein the records of the first task in the log within a predetermined time period are summed to analyze the performance of the first task within the predetermined time period so as to determine the performance of external access of the first task for a specific event, and the processor is further configured to select the first task for optimization when the summed records of the first task is greater than summed records of the second task.

2. The computer system of claim 1, wherein the processor further reads the counted value from the counter for external access counting of the PMU and recording the read value into the log as a record of the second task when a third task switch which is to the execution of the tasks from the second task to the first task occurs and resets the counter for external access counting of the PMU for the first task after the log is generated, wherein the records of the second task in the log within the predetermined time period are summed to obtain the summed records of the second task to analyze the performance of the second task within the predetermined time period so as to determine the performance of external access of the second task for the specific event.

3. The computer system of claim 1, wherein the first task further includes a plurality of function calls and the processor is further configured to:

provide a tag for each of the function calls;

generate the tag for a first function call of the function calls for counting the occurrence of the first function call every time the first function call is being performed prior to the occurrence of the second task switch; and     read a counted value for occurrence of the first function call and record the read value into the log of the storage device as a record of the first function call when the second task switch occurs.

4. The computer system of claim 1, wherein the processor further includes a plurality of processing cores and the processor is further configured to perform, at each processing core of the plurality of processing cores, the resetting of the counter for external access counting of the PMU when the first task switch occurs, the reading of the counted value and the recording of the read value when the second task switch occurs and the resetting of the counter for external access counting of the PMU for the second task after the log is generated;

wherein the records of the first task for all of the processing cores in the log within the predetermined time period are summed to analyze the performance of the first task within the predetermined time period so as to determine the performance of external access of the first task for the specific event.

5. The computer system of claim 1, wherein, the counter for external access counting of the PMU is a bus read/write register of the PMU.

6. The computer system of claim 1, wherein the computer system is a mobile device.

7. A non-transitory computer readable storage medium having instructions stored therein, which when executed by a computer system, cause the computer system to:

provide, by a processing unit, a callback function at a location at which a task switch is being performed;

reset, by the processing unit, a counter for external access counting of a performance monitoring unit (PMU) for performance monitoring on tasks when a first task switch which is to switch an execution of the tasks to a first task of the tasks occurs;

read, by the processing unit, a counted value from the counter for external access counting of the PMU and recording the read value into a log of a storage unit as a record of the first task when a second task switch which is to switch the execution of the tasks from the first task to a second task of the tasks occurs; and     reset, by the processing unit, the counter for external access counting of the PMU for the second task after the log is generated;

wherein the records of the first task in the log within a predetermined time period are summed to analyze the performance of the first task within the predetermined time period so as to determine the performance of external access of the first task for a specific event, and the computer system is caused to select the first task for optimization when the summed records of the first task is greater than a summed records of the second task.

8. A method for performance monitoring of tasks executed by a computer system comprising a processing unit and a storage unit, wherein the processing unit further includes a performance monitoring unit (PMU) for performance monitoring on the tasks and the tasks are switchable by the processing unit, the method comprising:

providing, by the processing unit, a callback function at a location at which a task switch is being performed;

resetting, by the processing unit, a counter for external access counting of the PMU when a first task switch which is to switch an execution of the tasks to a first task of the tasks occurs;

reading, by the processing unit, a counted value from the counter for external access counting of the PMU and recording the read value into a log of the storage unit as a record of the first task when a second task switch which is to switch the execution of the tasks from the first task to a second task of the tasks occurs; and     resetting, by the processing unit, the counter for external access counting of the PMU for the second task after the log is generated;

wherein the records of the first task in the log within a predetermined time period are summed to analyze the performance of the first task within the predetermined time period so as to determine the performance of external access of the first task for a specific event,     wherein the first task further includes a plurality of function calls and the method further comprises:

providing, by the processing unit, a tag for each of the function calls;

generating, by the processing unit, the tag for a first function call of the function calls for counting the occurrence of the first function call every time the first function call is being performed prior to the occurrence of the second task switch; and reading, by the processing unit, a counted value for occurrence of the first function call and recording the read value into the log of the storage unit as a record of the first function call when the second task switch occurs.

9. The method of claim 8, further comprising:

reading, by the processing unit, the counted value from the counter for external access counting of the PMU and recording the read value into the log as a record of the second task when a third task switch which is to switch the execution of the tasks from the second task to the first task occurs; and resetting, by the processing unit, the counter for external access counting of the PMU for the first task after the log is generated;

wherein the records of the second task in the log within the predetermined time period are summed to analyze the performance of the second task within the predetermined time period so as to determine the performance of external access of the second task for the specific event.

10. The method of claim 8, wherein the processing unit further includes a plurality of processing cores and the method further comprises:

performing, at each processing core of the plurality of processing cores, the resetting of the counter for external access counting of the PMU when the first task switch occurs, the reading of the counted value and the recording of the read value when the second task switch occurs and the resetting of the counter for external access counting of the PMU for the second task after the log is generated;

wherein the records of the first task for all of the processing cores in the log within the predetermined time period are summed to analyze the performance of the first task within the predetermined time period so as to determine the performance of external access of the first task for the specific event.

11. The method of claim 8, wherein the counter for external access counting of the PMU is a bus read/write register of the PMU.

* * * * *